United States Patent [19]
Conti et al.

[11] 3,757,078
[45] Sept. 4, 1973

[54] APPARATUS FOR REFOCUSING REFLECTED ENERGY AT A TARGET FOCAL POINT

[75] Inventors: Ronald J. Conti, Diamond Bar; Steven R. Berry, Pomona, both of Calif.

[73] Assignee: General Dynamics Corporation, Pomona, Calif.

[22] Filed: Aug. 19, 1971

[21] Appl. No.: 173,201

[52] U.S. Cl. ............................ 219/121 L, 240/41.3
[51] Int. Cl. ............................................. B23k 27/00
[58] Field of Search ................. 219/121 L, 121 EB, 219/349, 85; 240/41.3; 355/67; 331/94.5 P, 94.5 A

[56] References Cited
UNITED STATES PATENTS

| | | | |
|---|---|---|---|
| 3,603,766 | 9/1971 | Kino et al. | 219/121 L X |
| 3,621,198 | 11/1971 | Herbrich | 219/121 L X |
| 2,821,103 | 1/1958 | Blet | 356/236 |
| 3,460,930 | 8/1969 | Pityo | 219/121 L X |

OTHER PUBLICATIONS

"Carbon Dioxide Laser Welding" Welding Journal, October 1969, pp. 800–806.

*Primary Examiner*—R. F. Staubly
*Assistant Examiner*—George A. Montanye
*Attorney*—Edward B. Johnson et al.

[57] ABSTRACT

Apparatus for directing a beam of energy upon a workpiece including, a lens for focusing the beam of energy at a particular focal point, a holder for supporting the lens, a flange for providing cooling of the lens and a hemispherical mirror mounted to the holder having an opening through which the focussed beam passes and mounted in such a way as to refocus energy reflected by the workpiece back to the focal point of the lens.

14 Claims, 1 Drawing Figure

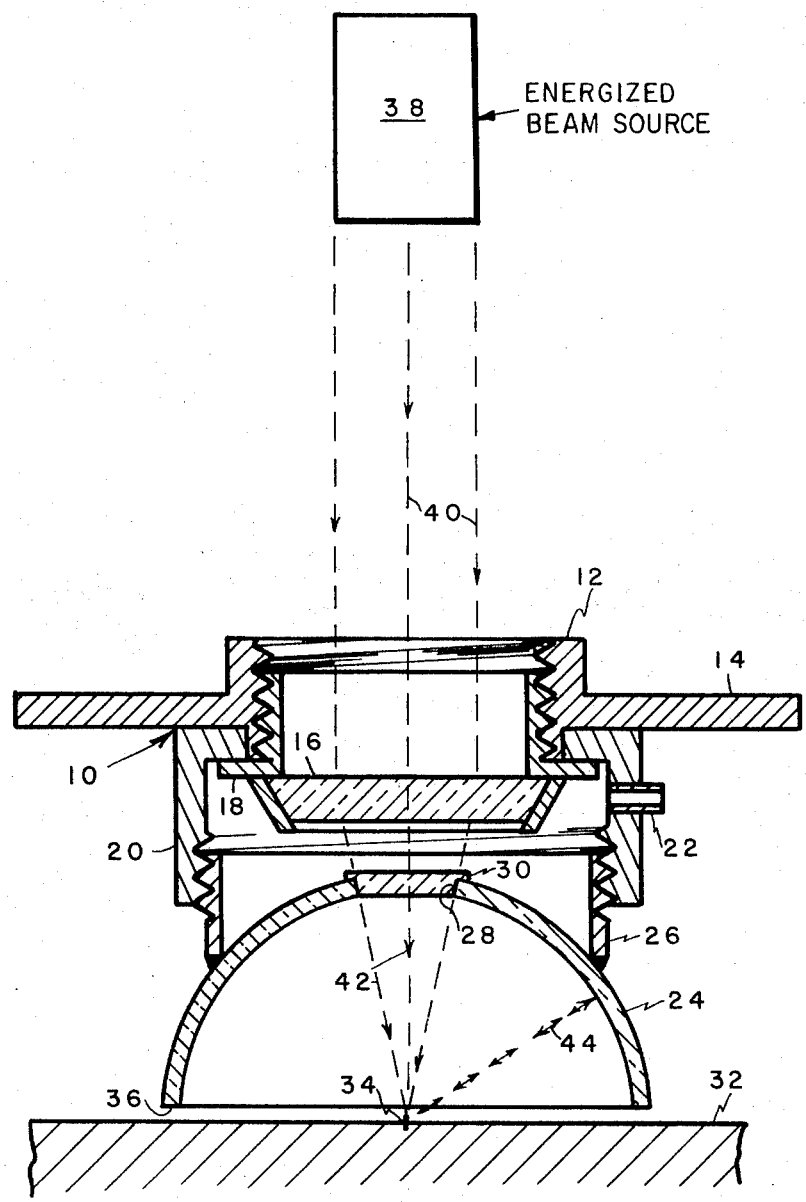

APPARATUS FOR REFOCUSING REFLECTED ENERGY AT A TARGET FOCAL POINT

BACKGROUND OF THE INVENTION

In recent years, energized beams such as electron or laser beams have been utilized to perform various heat working operations or processes upon materials. Such heat working operations as welding, drilling, cutting, machining, etc., have been performed by the use of energized beams. An optical maser device, commonly referred to as a laser (light amplification by stimulated emission of radiation) can produce a high intensity, collimated, coherent beam of light (photons) which can be focused to produce extremely high energy densities and resultant very high temperatures. Operations with these energized beams are, however, relatively inefficient since in many situations only 5–20 percent of the incident energy is absorbed by the workpiece or target material. In addition ot these reflection losses, spattering of the target material upon the focusing lens and the dissipation of heat from the focusing lens must be contended with.

SUMMARY OF THE INVENTION

The invention relates to the refocusing of an energized beam used in various heat working operations such as welding, brazing, drilling, cutting, machining and other similar operations. The energy reflected from the target material or workpiece is refocused back to the target by a hemispherical reflector which can also serve to protect the primary focusing lens from target material spatter. A heat sink can be provided around the primary focusing lens to increase the dissipation of heat from the lens.

BRIEF DESCRIPTION OF THE DRAWING

The single FIGURE is a sectional view of the energized beam refocuser of the present invention.

DESCRIPTION OF THE PREFERRED EMBODIMENTS

As shown in the single FIGURE, the energized beam refocuser 10 includes a generally cylindrical, internally threaded, support 12 having an outwardly extending flange 14. The primary focusing lens 16 is mounted in a lens holder 18 having external threads to engage the internal threads of the support 12. An annular flange 20, which may include a gas inlet 22, extends downward from the support 12 around the lens holder 18. The lower portion of this flange 20 is internally threaded. A substantially hemispherical mirror 24 having an externally threaded support 26 is positioned below the lens 16 by the annular flange 20. A central opening 28, which may be provided with a protective window 30 is included in the mirror 24 for the focused energy from the primary focusing lens 16.

The refocuser 10 is positioned above a workpiece 32 to which the heat working operation is to be directed. The target 34 on the workpiece 32 is the focal point of the primary focusing lens 16 and the mirror 24. A small gap 36 is provided between the mirror 24 and the workpiece 32 since the mirror 24 is not quite a complete hemisphere.

In operation, the lens 16 receives an energized beam 40 from a source 38 and focuses this beam at the target 34. This source 38 can be any conventional energized beam source such as an electron beam source or a laser. The lens 16 and the mirror 24, should be selected for the type and wave length of the energized beam from the source 38.

The converging energized beam 42 from the lens 16 will heat the workpiece 32 at the target 34 to perform the desired heat working operation. Any heat absorbed from the energized beam by the lens 16 will be dissipated through the support flange 14 which should be constructed of a good thermally conductive material such as aluminum or copper.

As previously indicated, only a small percentage of the energy directed at the target 34 (particularly a metallic target) is actually absorbed by the target 34 while a greater percentage is scattered or reflected away from the target 34. A great deal of this scattered or reflected energy can be re-reflected or refocused back to the target by the mirror 24 as refocused backscatter 44 since the focal point of the mirror is at the target 34.

The central opening 28 in the mirror 24 is required to permit the converging energized beam 42 to reach the target 34. Except for this opening 28, the mirror 24 protects the lens 16 from material spattered from the target 34 during the heat working operation. If further protection is required, a flow of an inert gas, such as argon, can be directed past the lens 16 through gas inlet 22 in annular flange 20. Alternately, a transparent window 30, of a material such as germanium or quartz, may be provided in the opening 28 to give complete spatter protection for the lens 16.

The mirror 24 can be of any reflective material or simply have a deposited reflective coating of a material such as aluminum, silver, or gold. If visibility of the target 34 is desired during the heat working operation, the mirror 24 may be constructed of glass or other transparent material deposited with a coating of moderate reflectance to the energized beam and moderate translucence to visible light. For an energized beam source 38 of the molecular carbon dioxide laser type, having an emitted wave length of 10.6 microns, a glass mirror having a thin vacuum deposition of gold would be suitable.

In this manner, the efficiency and heating rate of a variety of energized beam heat working operations can be greatly increased. Without the mirror, the energy scattered or reflected from the target is otherwise lost. Further, the refocusing mirror itself provides reasonable spatter protection for the primary focusing lens. This protection can be even further enhanced by the addition of a gas flow past the lens or by a window in the mirror, transparent to the wave length of the particular laser.

While specific embodiments of the invention have been illustrated and described, it is to be understood that these embodiments are provided by way of example only and that the invention is not to be construed as limited thereto, but only by the proper scope of the following claims.

What we claim is:

1. Apparatus for the energized beam heat working of a workpiece comprising:
    an energized beam source;
    a workpiece upon which heat working is to be performed;
    primary focusing optics means to receive the energized beam and to focus the energized beam at an optical focal point on the workpiece; and refocusing optics means operably disposed between said primary focusing optics means and the workpiece to receive reflected beam energy from the workpiece and to refocus the reflected beam energy back to the optical focal point of the primary focusing optics means.

2. The apparatus of claim 1 wherein said primary focusing optics means comprises:
a lens holder;
a focusing lens mounted in said lens holder; and
a support member disposed above the workpiece to removably mount said lens holder, said support member including means to dissipate heat absorbed from the energized beam by the lens.

3. The apparatus of claim 2 wherein said support member heat dissipating means comprises a flange disposed around and extending outwardly from said support member.

4. The apparatus of claim 1 wherein said refocusing optics means is a substantially hemispherical mirror having the same focal point as said primary focusing optics means.

5. The apparatus of claim 4 wherein said substantially hemispherical mirror has moderate translucence to visible light.

6. Apparatus for the energized beam heat working of a workpiece comprising:
a workpiece upon which heat working is to be performed;
a substantially hollow cylindrical support member disposed above the workpiece to be heat worked;
a high intensity, collimated, coherent, energized beam source;
a primary focusing lens to receive the high intensity, collimated, coherent, energized beam from said source and focus the energized beam at a focal point on the workpiece;
a primary focusing lens holder to mount said primary focusing lens, said lens holder removably disposed in said substantially hollow cylindrical support member;
a substantially annular member affixed to said substantially hollow cylindrical support member and extending towards the workpiece;
a substantially hemispherical mirror removably mounted to said substantially annular member, said substantially hemispherical mirror being at least moderately reflective to the energized beam; and a central opening located in said hemispherical mirror having the same focal point as the primary focusing lens through which the energized beam is focused at the focal point by the primary focusing lens.

7. The apparatus of claim 6 wherein said substantally hollow, cylindrical support member includes a heat dissipating flange disposed around and extending outward therefrom.

8. The apparatus of claim 6 wherein said substantially annular member includes a gas inlet means to receive a flow of an inert gas over the primary focusing lens.

9. The apparatus of claim 6 and in addition a window, of material substantially transparent to the focused energized beam, disposed in the central opening of said mirror.

10. The apparatus of claim 6, wherein said mirror is at least moderately translucent to visible light.

11. In combination:
a workpiece upon which heat working is to be performed:
a source of an energized beam;
energized beam focusing means disposed between said source and said workpiece to focus the energized beam at a target focal point on said workpiece, a first portion of the focused energized beam absorbed at the target focal point on said workpiece to perform a heat working thereon and a second portion of the focused energized beam reflected from the target focal point on said workpiece; and
reflected energized beam refocusing means disposed between said energized beam focusing means and said target focal point on said workpiece to refocus the reflected energized beam back to the target focal point, said energized beam focusing means and said reflected energized beam refocusing means having the same target focal point on said workpiece, said reflected energized beam refocusing means having a central opening therein through which the focused energized beam passes from the energized beam focusing means to the workpiece.

12. The apparatus of claim 11 wherein said reflected energized beam focusing means is a substantially hemispherical mirror having a focal point at the target focal point.

13. In combination:
a workpiece, partly absorptive and partly reflective to an energized beam, upon which a heat working is to be performed;
a high intensity, collimated, coherent, energized beam source;
a primary energized beam focusing lens disposed between said source and said workpiece to receive the energized beam from said source and focus the beam at a target focal point on said workpiece;
a primary focusing lens holder disposed around said primary focusing lens to mount said primary focusing lens;
a substantially hollow cylindrical support means disposed above said workpiece to removably support said primary energized beam focusing lens holder;
a substantially annular member affixed to said substantially hollow cylindrical support member and extending towards said workpiece; and
a substantially hemispherical mirror removably mounted to said substantially annular member to refocus any energized beam reflected from the workpiece back to the target focal point, said focusing lens and said hemispherical mirror having the same target focal point, said mirror having a central opening therein through which the focused energized beam passes from the focusing lens to the workpiece.

14. The apparatus of claim 13 wherein said source of the high intensity, collimated, coherent, energized beam is a laser.

* * * * *